UNITED STATES PATENT OFFICE.

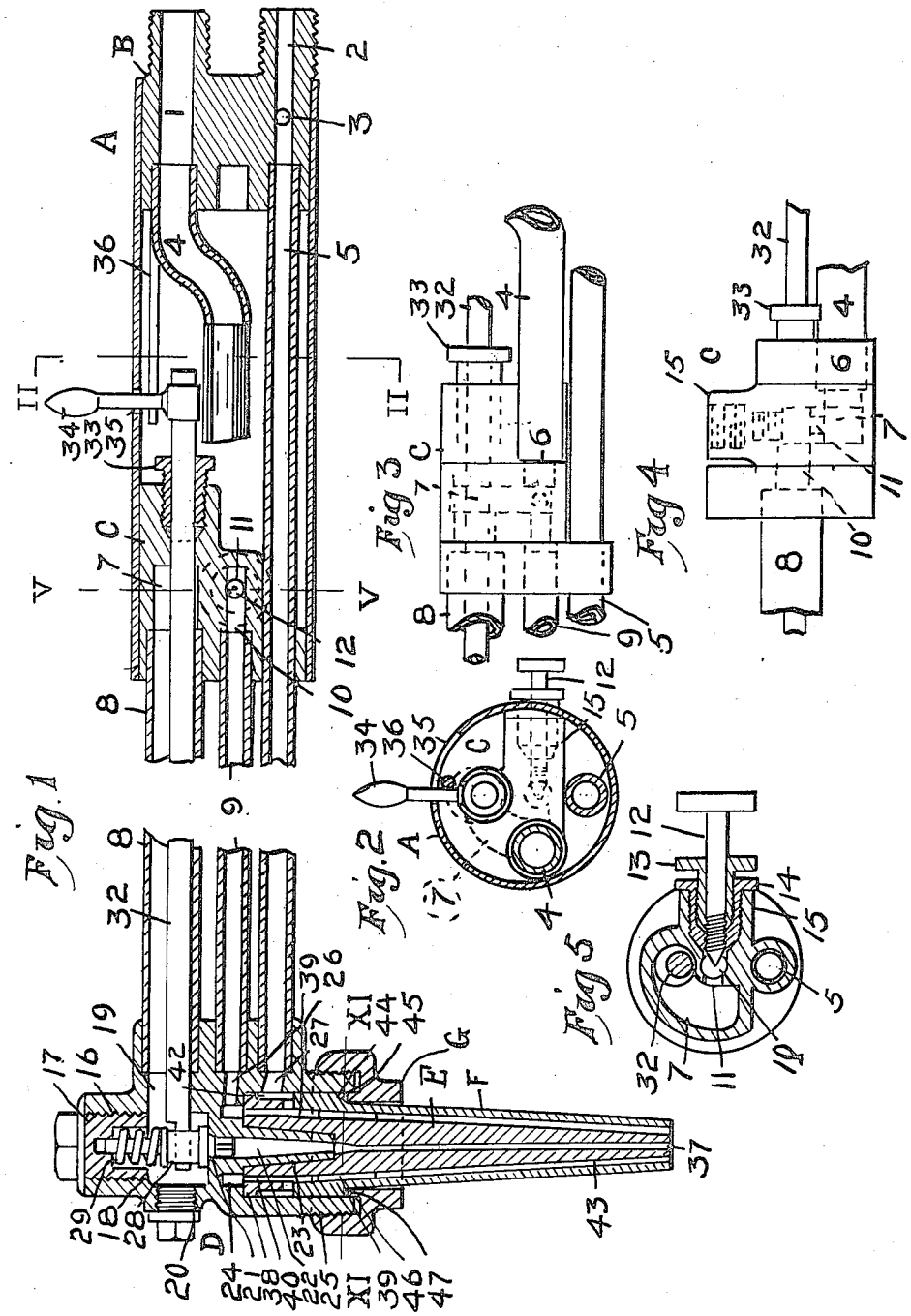

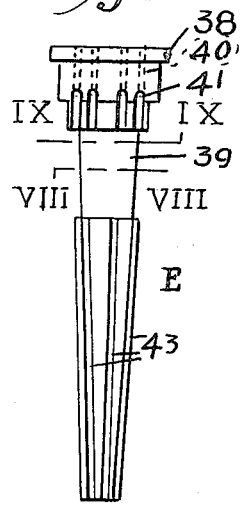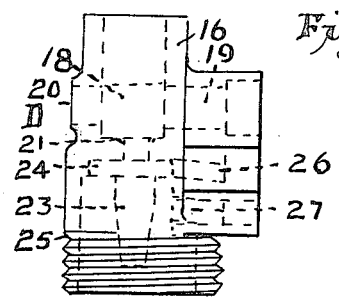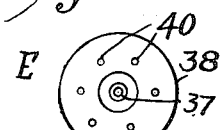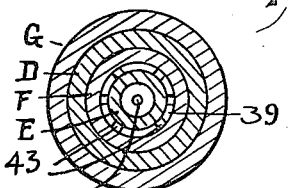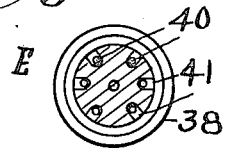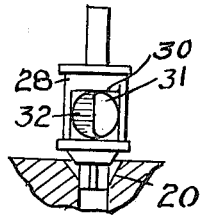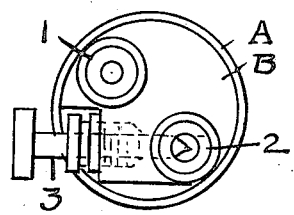

JAMES B. ANDERSON, OF SHALER TOWNSHIP, ALLEGHENY COUNTY, PENNSYLVANIA.

CUTTING-TORCH.

1,282,353. Specification of Letters Patent. Patented Oct. 22, 1918.

Application filed April 15, 1918. Serial No. 228,558.

*To all whom it may concern:*

Be it known that I, JAMES B. ANDERSON, citizen of the United States, and residing in the township of Shaler, in the county of Allegheny and State of Pennsylvania, have invented or discovered new and useful Improvements in Cutting-Torches, of which the following is a specification.

My invention consists in a new and improved cutting torch intended for use with oxygen and a heating gas, such as acetylene.

The object in view is the production of an inexpensive cutting torch of simple, inexpensive, yet substantial and durable construction, wherein the gases are readily controlled to form the proper heating mixture and the oxygen flame is under perfect control, so as to be adjusted, or thrown on or off, as may be desired.

In the accompanying drawings, which are intended as illustrative of the principles of my invention but not to limit the scope of the latter to the construction shown, Figure 1 is a longitudinal section of a torch embodying my present invention; Fig. 2 is a cross section of the same along the line II—II in Fig. 1; Fig. 3 is a broken side view with the handle shell removed; Fig. 4 is a plan view of the same; Fig. 5 is a cross section taken along the line V—V in Fig. 1; Fig. 6 is an elevation of the tip member dismounted from the torch; Fig. 7 is an end view of the same showing its head; Fig. 8 is a cross section of the same taken along the line VIII—VIII in Fig. 6; Fig. 9 is a similar view along the line IX—IX in Fig. 6; Fig. 10 is a detailed side elevation of the head member of the torch; Fig. 11 is a cross section taken along the line XI—XI in Fig. 1; Fig. 12 is an enlarged detail showing the cutting flame valve and its seat, and Fig. 13 is a butt end view of the torch.

The following is a detailed description of the drawings.

A is the handle consisting of a short length of tubing in the opposite ends of which are secured the butt member or casting B and the plug or casting C. D is the head of the torch. These elements are preferably of brass. The butt B is provided with two gas passages 1 and 2, for the admission of oxygen and a heating gas, respectively, means being provided for coupling to the outer end of said passages the usual rubber tubes leading from gas bottles. The passage 2 is provided with a needle valve 3 for the control of the gas.

The inner ends of said passages 1 and 2 are countersunk to receive and have secured therein the ends of tubes 4 and 5, respectively. The tube 5 extends through a bore in the casting C to the head D, while the tube 4 is curved downwardly and outwardly, as shown in Figs. 1, 2 and 3, to be secured in the port 6 communicating with the arc shaped passage 7 in the casting C, which passage connects with a port in said casting, in which port is secured the end of the high pressure or cutting oxygen tube 8 extending to the head D. 9 is the low pressure or heating oxygen tube connected to the head D and having its other end fixed in the outer enlarged end of a port 10 in casting C whose inner end is connected by the valve seat 11 with the passage 7. The communication between the port 10 and the passage 7 is controlled by a needle valve 12 mounted in said casting and adapted to engage the seat 11. The valve works in a gland 13 and bushing 14 mounted in the seat 15 in said casting.

The casting which forms the head D is provided with an axial bore 16 threaded to receive the plug 17 and connecting at its inner end with the valve chamber 18 into which leads a lateral port 19 in which is fixed the end of the high pressure tube 8. 20 is an access port closed by a screw plug. 21 is a tapered valve seat connecting the chamber 18 with the axial bore 22 of an exteriorly tapered nozzle 23 integral with the head and surrounded by an annular chamber 24. 25 is an exteriorly threaded annular flange surrounding said nozzle and spaced apart therefrom.

The end of the low pressure oxygen tube 9 is fixed in a port 26 leading into the chamber 24 while the end of the gas tube 5 is fixed in a port 27 near the base of the flange 25.

28 is a valve in chamber 18 adapted to engage the seat 21 and normally held closed by a helical spring 29 coiled about its stem and bearing on the plug 17 and the valve. 30 is a cam seat in the valve engaged by a cam 31 on the end of a valve rod 32 extending rearwardly in the high pressure tube 8 and out through a gland 33 in the outer end of said tube. The outer end of said rod is provided with a radial lever 34 extending through a circumferentially extended slot 35 in the handle tube A. 36 is a leaf spring mounted on the butt B and tending by engagement with the lever 34 to hold the valve 28 closed. Thus the valve may be opened against the spring 29 by the thumb of the workman pressing against the lever 34 and a release of such pressure will cause the valve to close automatically.

E is the demountable tip adapted to be secured to the head D and provided with an axial bore 37 whose inner end is flared to receive the nozzle 23, the bores of the nozzle and tip forming a continuous passage. The inner end of the tip is cylindrical and provided with an annular flange 38 which fits up inside of the flange 25 and forms a wall of the chamber 24. Beyond the cylindrical head of said tip, the latter tapers outwardly and adjacent to the head is of reduced diameter to form an annular chamber 39 when the parts are assembled, and 40 represents an annularly disposed series of longitudinal ports leading through the cylindrical head of the tip and connecting the chambers 24 and 39. The outer ends of said passages are connected by radial ports 41 with the annular chamber 42 formed between the cylindrical head of the tip and the flange 25 and into which the port 27 admits the gas from the tube 5. 43 represents longitudinal grooves cut in the perimeter of the tip E from the chamber 39 to the outer end of the tip.

F is a tapered sleeve adapted to fit over the tip E and provided with a cylindrical head 44 which fits in the flange 25 and is provided with a circumferential shoulder 45 against which bears the annular clamping nut G whose bore encircles the sleeve F and screwed on the flange 25. The inner end of the sleeve F forms a wall of the annular chamber 42. The nut is provided with an annular lip 46 which enters the interior of the annular flange 25 and bears against the shoulder 45 of the sleeve F, thus forcing said sleeve and said tip rigidly into position. Clearance is provided between said nut and the outer edge of the flange 25 of the head. The joint between the annular lip 46 of the clamping nut, and the shoulder 45 of the sleeve may be provided with a packing or gasket 47, as shown in Fig. 1.

In the operation of my improved torch the mixture of heating gases is controlled by the valves 3 and 12, the two gases entering through the ports 26 and 27 and intermingling in the annular chamber 39 and the combined gases passing out through the grooves 43 to the end of the tip where the gas is ignited to form the heating agent. The high pressure oxygen flame for cutting is fed by oxygen passing through the tubes 1 and 8 to the valve chamber 18 and therein to the bore 37 of the tip. The valve 28 is under constant and complete control by means of the lever 34 which is convenient to the thumb of the hand with which the operator grasps the handle A.

The insertion of the nozzle 23 into the upper end of the bore 37 of the tip E, the outer end of the nozzle being extended outwardly beyond the union between the end of the tip and the head D, prevents any possibility of the escape of gas through the joint between the tip and the head, but the cutting gas moves in full volume out through the bore 37. Thus the joint between the nozzle 23 and the tapered end of the bore 37 does not need to be packed or otherwise arranged to prevent the lateral escape of gas.

Every part of the torch is accessible owing to the ease with which the elements may be assembled and disassembled, and in case of the tip becoming impaired, a new one may be quickly substituted.

What I desire to claim is:—

1. In a cutting torch, a handle, a head provided with a mixing chamber and a valve chamber, a tube for a combustible gas and a tube for low pressure oxygen mounted in said handle and communicating with said mixing chamber, a tube for high pressure oxygen mounted in said handle and communicating with said valve chamber, a tip secured to said head and provided with a central bore connected with said valve chamber and eccentric passages connected to said mixing chamber, a valve interposed between said valve chamber and said bore, and a rotary valve rod mounted in said handle to operate said valve, substantially as and for the purposes set forth.

2. In a cutting torch, a handle, a head provided with a mixing chamber and a valve chamber, a tube for a combustible gas and a tube for low pressure oxygen mounted in said handle and communicating with said mixing chamber, a tube for high pressure oxygen mounted in said handle and communicating with said valve chamber, a tip secured to said head, and provided with a central bore connected with said valve chamber and eccentric passages connected with said mixing chamber, a valve interposed between said valve chamber and said bore and provided with a cam seat, and a rotary cam rod engaging said seat and extending back along said handle, substantially as and for the purposes set forth.

3. In a cutting torch, a handle, a head provided with a mixing chamber and a valve chamber, a tube for a combustible gas and a tube for low pressure oxygen mounted in said handle and communicating with said mixing chamber, a tube for high pressure oxygen mounted in said handle and communicating with said valve chamber, a tip secured to said head and provided with passages communicating respectively with said mixing chamber and said valve chamber, a valve interposed between said valve chamber and the corresponding passage in said tip, and a control rod for said valve extending back along said handle, said head being provided with screw plugged apertures in line with said valve and said rod, whereby they may be inserted into and removed from said head, substantially as and for the purposes set forth.

4. In a cutting torch, in combination with a head provided with oxygen chamber, a nozzle provided with an axial bore communicating with said chamber, a threaded annular flange concentric with said nozzle and a valve interposed between said chamber and said bore, a tip having the inner end of its axial bore flared to fit over said nozzle and provided with an eccentric passage communicating with the interior of said flange, a clamping nut engaging said tip and screwing onto said flange and means for supplying cutting oxygen to said gas chamber and low pressure oxygen and a combustible gas to the interior of said annular flange, substantially as and for the purposes set forth.

Signed at Pittsburgh, Pa., this 10th day of April, 1918.

JAMES B. ANDERSON.